United States Patent [19]
Von Holdt, Sr.

[11] Patent Number: 5,262,116
[45] Date of Patent: Nov. 16, 1993

[54] MODULAR MOLDING SYSTEM

[76] Inventor: John Von Holdt, Sr., 6864 Lexington La., Niles, Ill. 60648

[21] Appl. No.: 878,674

[22] Filed: May 5, 1992

[51] Int. Cl.$^5$ .............................................. B29C 45/26
[52] U.S. Cl. .............................. 264/297.2; 425/192 R; 425/195; 425/577
[58] Field of Search ........... 425/183, 186, 188, 192 R, 425/190, 195, 577; 249/165; 264/328.7, 297.2

[56] References Cited

U.S. PATENT DOCUMENTS

| | | | |
|---|---|---|---|
| 3,564,660 | 2/1971 | Darnell | 425/192 |
| 3,930,778 | 1/1976 | Roncelli | 425/192 R |
| 4,795,125 | 1/1989 | Boros et al. | 425/195 |
| 4,828,479 | 5/1989 | Pleasant | 425/192 R |
| 4,856,977 | 8/1989 | Von Holdt | 425/192 R |
| 4,867,668 | 9/1989 | Miyairi | 425/192 R |
| 4,927,347 | 5/1990 | Golata et al. | 425/150 |

*Primary Examiner*—Jill L. Heitbrink
*Attorney, Agent, or Firm*—Allegretti & Witcoff, Ltd.

[57] ABSTRACT

Injection molding takes place in a molding chamber which is formed between a core-defining member as part of a mold core assembly and a cavity-defining member as part of a mold cavity assembly. One removes a first mold core and mold cavity-defining member from the mold core and mold cavity assemblies when desired molding by means thereof has been accomplished, and replaces them with a new core-defining member and cavity-defining member to form a molding chamber of a different design. These are respectively secured to the remainder of the mold core assembly and mold cavity assembly, so that the main portions of the mold core and mold cavity assemblies may be retained in a mold press, and differing products may be manufactured. Also, a last object may be molded in the molding chamber of the mold core and cavity-defining members and then, without opening the core-defining member and cavity-defining member, the latter may be removed from the respective remainders of the mold core assembly and mold cavity assembly with the last molded object residing in the molding chamber.

30 Claims, 5 Drawing Sheets

FIG. 15

MODULAR MOLDING SYSTEM

BACKGROUND OF THE INVENTION

Large injection molds are used to make a wide variety of molded items such as pails and lids. Typically, the various molded items are offered for sale in a variety of different sizes, which requires that the molding operation has to be terminated, and the complete injection mold assembly must be removed from the molding apparatus for replacement with a complete mold of different size, for molding an article of different size. To do this conventionally, the water and air lines connected to the complete mold must be disconnected. Also, the complete mold assemblies are large, bulky items which require a large storage space when not in the molding press, especially for the molding of multiple, thin-walled containers, which require close molding tolerances.

Thus, the setting up of production of a different design of molded articles is typically a rather complex and time consuming operation, requiring a plurality of expensive, complete mold assemblies.

By this invention, a modular system is provided in which significant portion of the mold is reusable in the manufacture of a number of different designs of molded articles. Particularly, it is possible for the water and air line-carrying portions of the mold to be permanently installed in the molding apparatus, with different, inner, modular cavity and core portions which define the actual molding chamber being those portions which are removed as it is desired, to mold different designs or sizes of molded articles.

Thus, the size and weight of the actual items that are replaced in the mold when a design change is desired is significantly reduced, making the operation simpler. Similarly, significant cost is saved by the reuse of portions of the mold so that, for each design of molded article, only a smaller piece of metal is required for each of an internal core-defining member and cavity-defining member. Also, there is a significant improvement in the convenience of replacing the internal mold portions, when compared with the former manner of replacing the entire mold assemblies.

DESCRIPTION OF THE INVENTION

In this invention, a method of injection molding objects in a molding chamber is provided. The molding chamber is formed between a core-defining member as part of a mold core assembly and a cavity-defining member as part of a mold cavity assembly, with the mold core assembly and cavity assembly conventionally opening to remove the molded objects between mold shots.

In accordance with this invention, one molds objects in a conventional process of injection molding in a mold, following which one removes the core-defining member and the cavity-defining member, and replaces them with a new core-defining member and a new cavity-defining member forming a molding chamber of a different design. The new core-defining and cavity-defining members are thereafter respectively secured to the remainder of the mold, for molding of a different design of article while making use of a substantial portion of the mold, particularly the portion which carries the hot runner system and the manual connections for the water and air lines.

It is preferable to replace the first core-defining member and cavity-defining member by the steps of molding a last object in the molding chamber, and thereafter, without opening the core-defining member and cavity-defining member, removing the core-defining member and cavity-defining member together from the respective remainder of the mold, with the last molded object residing in the molding chamber. Thus, the last object provides to the core-defining member and cavity-defining member a measure of adhesion to hold the two members together in joined relationship as they are removed from the remainder of the mold, typically by removal of bolts. Of course it is easily possible to separate the core and cavity-defining members with a positive effort, but the presence of the last, molded object in the molding chamber reduces the likelihood of sudden, accidental separation during normal handling and storage of the mold components. Additionally, the molded last object is of course very dry, having been made of highly heated plastic material, so that upon storage it provides protection against corrosion to the walls of the molding chamber.

It is generally preferred for the respective molding chambers of different size, defined by the sequence of core and cavity-defining members discussed above, to define respective molding chambers having opposed ends of the same shape and size.

An injection mold can be provided which comprises a mold core assembly carrying a core-defining member and a mold cavity assembly carrying a cavity-defining member. The mold core and mold cavity assemblies are conventionally movable between a closed position in which the core and cavity-defining members together define a molding chamber, and an open position in which molded articles may be removed from the chamber. A molding compound sprue conventionally communicates with the molding chamber.

By this invention, releasable means are provided for respectively carrying the core and the cavity-defining members in the mold assemblies, for example on the mold core and mold cavity back up mounting plates. As before, this permits frequent replacement of the core and cavity-defining members with different core and cavity-defining members, to simplify the changing of the molding apparatus from one molded product to another.

Preferably, the mold of this invention has releasable means which comprises a system of bolts and bolt holes, for connection between the core and cavity-defining members and the respective mold core and mold back-up mounting plates. New core and cavity-defining members may carry the same bolt hole pattern, to serve as a modular replacement in the mold core and mold cavity assemblies, for the advantages described above.

It is also preferable for the mold core assembly to carry a first ring and the mold cavity assembly to carry a second ring. The first and second rings meet in end-abutting relation in the closed position of the mold, and are spaced from each other in the open position. One of the abutting ends of the rings defines radial rib means, while the other of the abutting ends define radial recess means, proportioned to receive the radial rib means in close-fitting relation in the mold-closed position. This provides a system where the mold portions remain centered under high molding pressure as described in U.S. Pat. No. 4,856,977, being particularly desirable for use with thin-walled containers.

In some embodiments, at least some of the radial rib means and their recess means receiving the radial rib means are of truncated triangular shape.

As another aspect of this invention, there is provided the capability of replacement of the mold core and cavity-defining members, in which various complex but conventional components of an injection mold are more permanently carried on the mold press for example, such as, the mold platens, the hot runner system, the gates, a rack, pinion, and gear mechanism, the outboard mold support system, and the like. Other conventional components which may be used permanently or semi-permanently are mentioned below.

As another aspect of this invention, the core-defining member and/or the cavity-defining member may be respectively carried in the remainder of the mold core assembly and/or mold cavity assembly by extension of one of the members into a tapered socket of the other, with both of the members defining a conical sidewall of the same angle, which angle is essentially 8 to 11 degrees. As described below, such an angle provides a semi-locking fit in which the two components fit together with absolutely firm, rigid connection without any rocking or play. At the same time, the two components are readily separable, contrary to a true locking fit provided by tapering, conical surfaces of 7½ degrees or less, and also contrary to a 15 degree taper, which is customarily used in separable molding tapers so that the two surfaces may be frequently separated and brought together without significant wear. Thus, the 8 to 11, and preferably 8 to 10, degree taper connection used herein has been previously deemed undesirable in the molding field because of the potential high wear that such a taper would exhibit if it were used in conventional molding.

DESCRIPTION OF SPECIFIC EMBODIMENTS

Referring to FIGS. 1 through 5, an injection mold in accordance with this invention is shown in a sequence of steps which illustrate a method of this invention.

Figure 1:
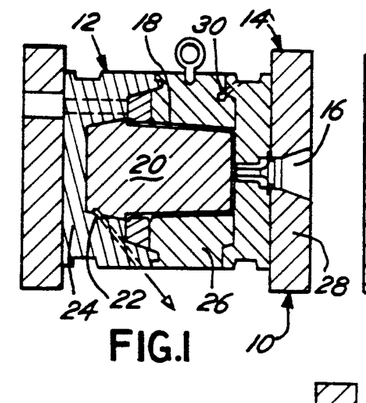
FIGS. 1 through 5 are longitudinal sectional views of the mold of this invention, shown in various stages of installation and removal of the core-defining and cavity-defining member to and from the mold core assembly and mold cavity assembly of an injection mold.

Injection mold 10 comprises mold core assembly 12 and a mold cavity assembly 14, which are generally of conventional construction except as otherwise described in this invention.

Mold cavity assembly 14 defines a conventional sprue 16 which provides access for molten molding compound to pass into the molding chamber 18, which is defined between mold core assembly 12 and cavity assembly 14 to permit the molding of, in this specific instance, a plastic bucket.

Mold 10 is mounted into a conventional injection molding apparatus, to cause the mold core assembly 12 and cavity assembly 14 to be openable to remove the molded objects and closeable to define the molding chamber 18, in an overall conventional manner. Mold 10 may define conventional articles and parts such as mold platens, leader pins, bushings, a hot runner system, an ejector system, gates, screws, dowel pins, leader pins and bushings, an outboard mold support system, rack, pinion, and gear mechanisms, and the like. Air and water lines are also typically provided to facilitate cooling and removal of the molded parts.

In accordance with this invention, mold core assembly 12 defines a core-defining member 20 as part of the mold core assembly. Core-defining member 20 may be secured by bolts 22 to the balance 24 of the mold core assembly 12, with core-defining member 20 being the very part that defines mold chamber 18.

Mold cavity assembly 14 defines a cavity-defining member 26, which is removably secured to the balance of mold cavity assembly 28 by bolts 30 or the like, so that mold cavity-defining assembly 26 defines at least a substantial portion of molding chamber 18 as shown.

Thus, it becomes possible to remove core defining member 20 and cavity-defining member 26 with ease from the remainder of the mold core assembly 12 and cavity assembly 14, while the mold remains in its open position, mounted in a mold press.

Specifically by this invention, referring to FIG. 1, one can mold a last object in the molding chamber 18. Thereafter, without opening the core-defining member 20 and cavity-defining member 26, one removes the core-defining member and cavity-defining member from the respective remainder 24, 28 of the mold core assembly 12 and the mold cavity assembly 14. This is illustrated in a first step in FIG. 2, where bolts 22 are removed, and core-defining member 2 is removed from the remainder 24 of mold core assembly 12. Before this is done, mold cavity-defining member 26 may be connected to a hook 32 to suspend the respective parts 20, 26 through an eye 34.

Figure 3:
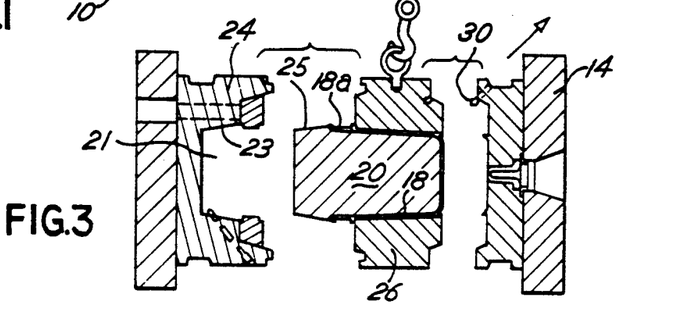

Then, mold cavity-defining member 26 may be separated from the balance of mold cavity assembly 14 as shown in FIG. 3 by removal of bolts 30, so that core and cavity-defining members 20, 26 are together separated from their mating parts, while they remain in a closed relationship. This closed relationship is facilitated by the presence of the last molded part 18a, which serves to provide a bond between the two parts 20, 26, although the bond is not expected to be strong.

It can be seen that the removal of parts 20, 26 is very simple and easy being generally done at the end of a production run. Then, it may be desired for another production run of a different design of molded article to be provided.

Figure 4:
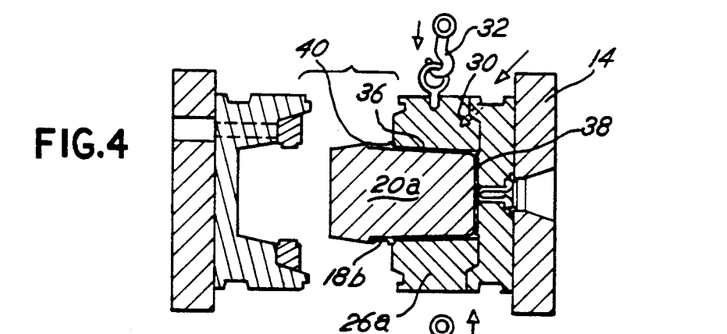

To accomplish this, another core-defining member 20a and cavity-defining member 26a, in engaging relation as the similar members 20, 26, is provided by hook 32 to mold 10, with molded member 18b positioned between them in molding chamber 36. The molding chamber 36 defined between them is typically of a different shape or size than the prior molding chamber 18, but the respective ends 38, 40 of molding chamber 36 are typically of the same dimensions as the first molding chamber 18. For example, molding chamber 36 may be somewhat shorter or longer than molding chamber 18, or of a different circumferential shape, or with projections of a different design, or the like.

As shown in FIG. 4, new cavity-defining member 26a defines bolt holes which are similarly positioned to those of cavity-defining member 26, so that bolts 30 may be used again to attach member 26a to the balance of mold cavity assembly 14.

Figure 5:
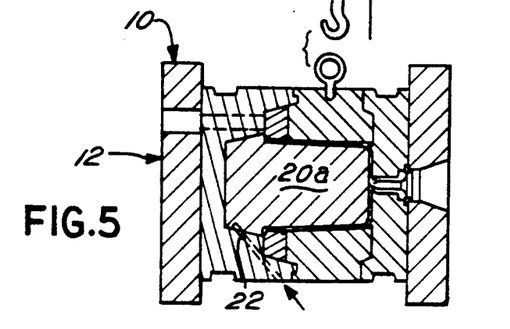

Then, as shown in FIG. 5, core-defining member 20a is brought into engagement with mold core assembly 12, and bolts 22 applied here as well. Core-defining member 20a may have a bolt hole pattern similar to that of core-defining assembly 20 and previous member 20.

Mold 10 is ready for further operation for the manufacture of a molded object of somewhat different design than in the arrangement of FIG. 1. This is accomplished with minimal effort, with little more than unbolting and bolting of the parts.

Water and air lines may occupy portions 24, 28 and can remain intact, without need to be disconnected and reconnected. So, because of the greatly reduced size and weight of the parts that are changed, the job is easier, and less nicking and other abuse is likely to take place during the transfer of the parts. Air and water line portions occupying core-defining member 20a may be set up in a manner similar to FIG. 6.

Thus, by such a modular design and specifically the process illustrated above, significant advantages in both time and ease of turnaround of a molding apparatus from the manufacture of one lot of product to another lot is greatly reduced by this invention. Containers of different volumes and wall thicknesses can be quickly and easily manufactured. If a new container is desired, a new mating, core-defining and cavity-defining member may simply be manufactured, at greatly reduced cost, and fitted into the mold 10 of this invention as shown above, to provide a mold system of great flexibility and ease of use.

It can be seen that core defining member 20 occupies a socket 21 defined by the remainder 24 of mold core assembly 12. It can be seen that the annular sidewall 23 (FIGS. 2 and 3) in socket 21 is outwardly tapered, preferably at an angle of 8 to 10 degrees. Tapered end 25 of core-defining member 20 then fits into socket 21 and has a tapered sidewall of the same angle as sidewall 23, essentially 8 to 10 degrees, so that the two surfaces are closely mating when in engagement.

Figure 2:
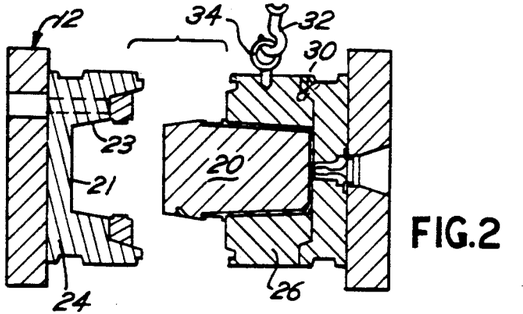

This provides a significant advantage of mold construction by providing a fit which may be known as a "semi-locking fit". It is known that a conical projection will fit into a conical socket, both being of the same angle of essentially 7½ degrees or less, with a "locking" fit. The well known luer connection of medical connectors is based on this principle. On the other hand, taped conical surfaces of cores and cavities which engage each other and separate in a molding process typically are about 15 degrees so that the repeated engagement and separation can be smooth and non-wearing. However, at a taper of essentially 8 to 11 degrees, a semi-locking condition exists where the core-defining member 20, having a taper of preferably 8 to 10 degrees, fits in socket 21 in a very firm, solid, non-rocking manner just as if the two members 20, 24 were a single piece. Nevertheless, the two pieces are not locked together, and can be readily removed when that is desired.

At angles substantially above 10 degrees, this semi-locking characteristic goes away, and the two members then would have to be held in place by some other means to avoid a measure of rocking during the mold shot, which could vary the dimensions of the molded product. It is known that such an 8-11 degree taper angle for surfaces 23, 25 causes some wear as the parts are brought together and taken apart, so that such a taper angle would never be used in a conventional molding process between two openable and closeable parts. However, in the use of this invention that wear is of little concern because the respective parts 20, 24 are only removed and replaced on occasion, for example once a day or less, rather than being opened and closed thousands of times a day, as with abutting, tapered surfaces of openable and closeable mold components.

Thus there is provided by this invention, for the first time, a mold half which is capable of being easily separated into two pieces, yet when placed together the two components of the mold half are solid and rocklike in their aspect, just as if they were a single piece.

Figure 6:
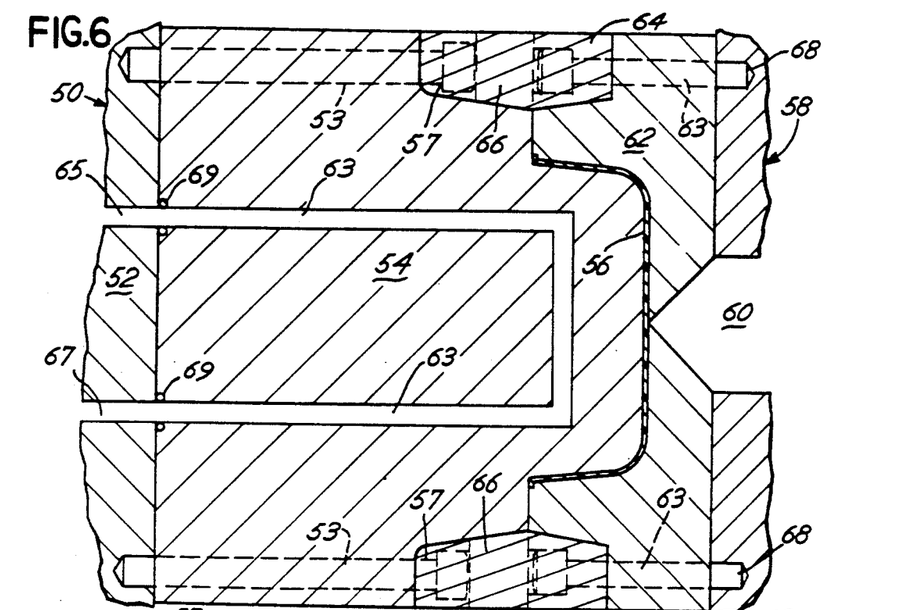
FIG. 6 is a longitudinal sectional view of an injection mold of this invention.

Referring to FIG. 6, a more detailed view of a mold of this invention is shown. The mold is of conventional injection mold design except as otherwise indicated.

A mold core assembly 50 comprises a permanent portion 52, typically containing the various parts previously mentioned such as water cooling lines and the like, and, bolted thereto by bolts 53, core-defining member 54 as shown, which is an interchangeable part of a design depending upon the shape of the mold chamber and resulting product 56 that is desired.

A permanent core ring 57 is also provided, but positioned removably on core-defining member 54. "Permanent" as describing the rings indicates that the core ring 57 and others may be typically used in most or all of the various modular configurations of the mold of this invention, even though they are removable.

Mold cavity assembly 58 is also present, being of conventional design except as otherwise indicated, and defining a sprue 60. Cavity-defining member 62 is bolted to the remainder of mold cavity assembly 58 by bolts 58 as shown, and also carries permanent cavity ring 64. Core ring 57 and cavity ring 64 interlock with each other in area 66 in a manner exemplified particularly by FIGS. 10 through 12, as discussed below, to facilitate the centering of the mold halves. Thus the mold of FIG. 6 operates in normal manner, opening and closing in a mold press to mold containers or other objects in molding chamber 56.

Figure 7:
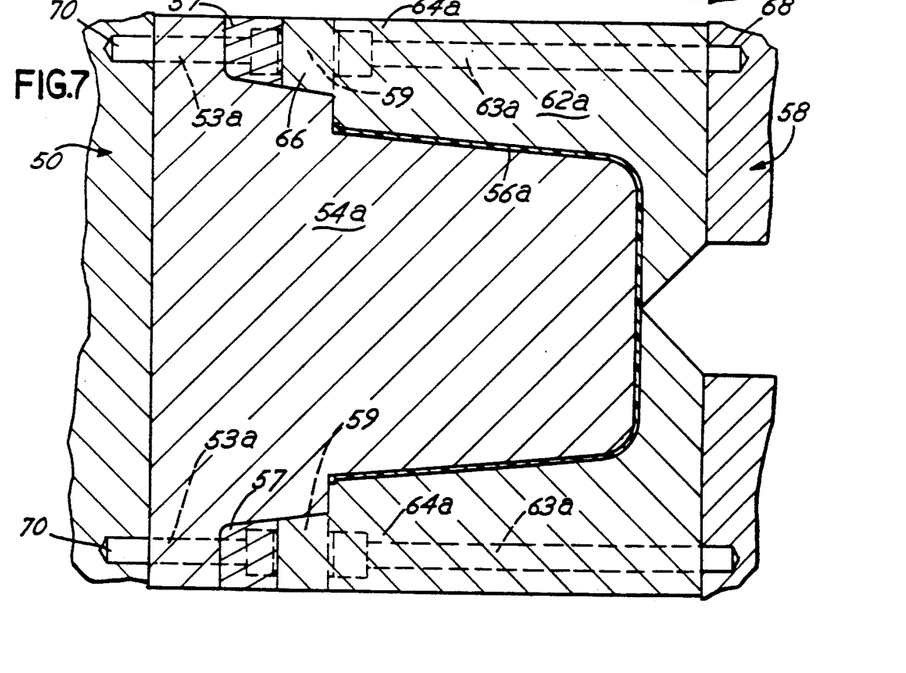
FIG. 7 is a longitudinal sectional view of the same injection mold, in which the core and cavity-defining members shown in the previous drawing have been replaced with new core and cavity defining members.

Then, when it is desired to mold a container of different design, the same mold core and cavity assemblies 50, 58 may be used with the same mold press, by the simple replacement of core-defining and cavity-defining members 54a, 62a, with new core and cavity-defining members 54a, 62a, as in FIG. 7. It can be seen that these new members 54a, 62a may be attached by new bolts 53a, 63a, to their respective members 50, 58 without any change in the spacing between the other portions of members 50, 58 during the molding operation. Therefore, the mold overall and the mold press can operate in the second instance of FIG. 7 as it was operating in FIG. 6. However, it can be seen that the shape of molding chamber 56a has been substantially changed for a new design of molded product. Also, it can be seen that the bolt holes 68, 70 of the respective cavity and core-defining members 58, 50 are of a pattern that matches both of the cavity and core-defining members so that the respective members 54, 54a, 62, 62a readily fit in and are attached in their desired position.

A water line 63 may be positioned in core-defining member 54 to provide water cooling to the member. As is conventional, the cooling water line 63 can extend in a U-shaped path to communicate between a water inlet line 65 and an outlet line 67 defined in permanent portion 52 of mold core assembly 50. O-rings 69 may be carried either by portion 52 or portion 54 to provide spontaneous, automatic sealing as the two portions 52, 54 are brought together. Thus, it can be seen that a permanently mounted portion 52 of mold core assembly 50 may be installed in a large injection molding apparatus, with the manual connections of the water line being generally permanently attached. When member 54 is bolted in place, a spontaneous connection may arise between the various portions 63, 65, 67 of the water line, so that no manual connecting of water line portions is required when core-defining and cavity-defining members are replaced.

Similarly, line 63 may represent a conventional air line as desired, having a similar connection to a permanent line for similar convenience of operation.

The embodiment of FIG. 7 may carry a similar water or air line to that described above.

It can also be seen that core-defining member 54 and cavity-defining member 62, which are the readily removable portions, may be free of the mold platens, mountings for leader pins, bushings, a hot runner system, an ejector system if any except for an air line, gates, screws, dowel pins, leader pins and bushings, an outboard mold support system, and rack, pinion, and gear mechanisms. All of these conventional items may be basically carried by the permanent portions of the mold, and thus do not have to be replaced with members 54, 62 in order to effect molding of another design of product.

Thus it can be seen from FIGS. 6 and 7 that two, and actually any number, of different designs of molded articles can be molded in the same mold press and substantially the same mold core and cavity assemblies 52, 58, simply by the bolting and unbolting of replaceable, relatively simple inner mold chamber-defining portions.

The embodiment of FIG. 7 differs from then embodiment of FIG. 6 in that cavity-defining member 62a defines an integral cavity ring portion 64a as part thereof, so that, unlike FIG. 6, a separate ring 64 is not used in this instance. The forward surface 59 of integral area 64a may be of the same profile as mold cavity ring 64, so that interlocking takes place at area 66 in the same way as in the previous embodiment, for the same purpose of providing firm and strong centering of the mold halves during the molding operation, with good resistance of the stresses and strains that can be imparted by high molding pressures as further discussed immediately below.

Figure 10:
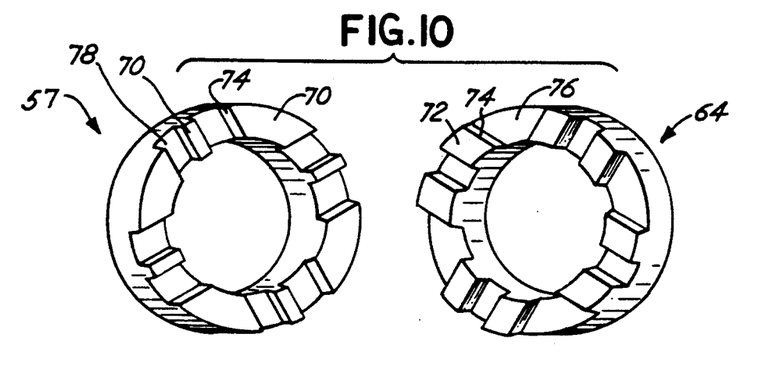
FIG. 10 is a perspective view of a pair of interengagable centering rings carried by the respective mold halves.

Referring to FIG. 10, mold core ring 57 and mold cavity ring 64 are shown in perspective. It can be seen that each of rings 57, 64 define substantially radial ribs 70, 72, typically having sides 74 tapered to an angle sufficient to allow easy end-abutting engagement as shown in area 66 of FIG. 6, where the radial rib 70, 72 engage radial recesses 76, 78 so as to provide automatic and reliable centering of the respective mold halves of such a nature that off-center distortion is prevented upon pressurization of the mold chamber. This principle is as expressed in Von Holdt U.S. Pat. No. 4,856,977, and is further described therein.

Figures 11, 12, 13:
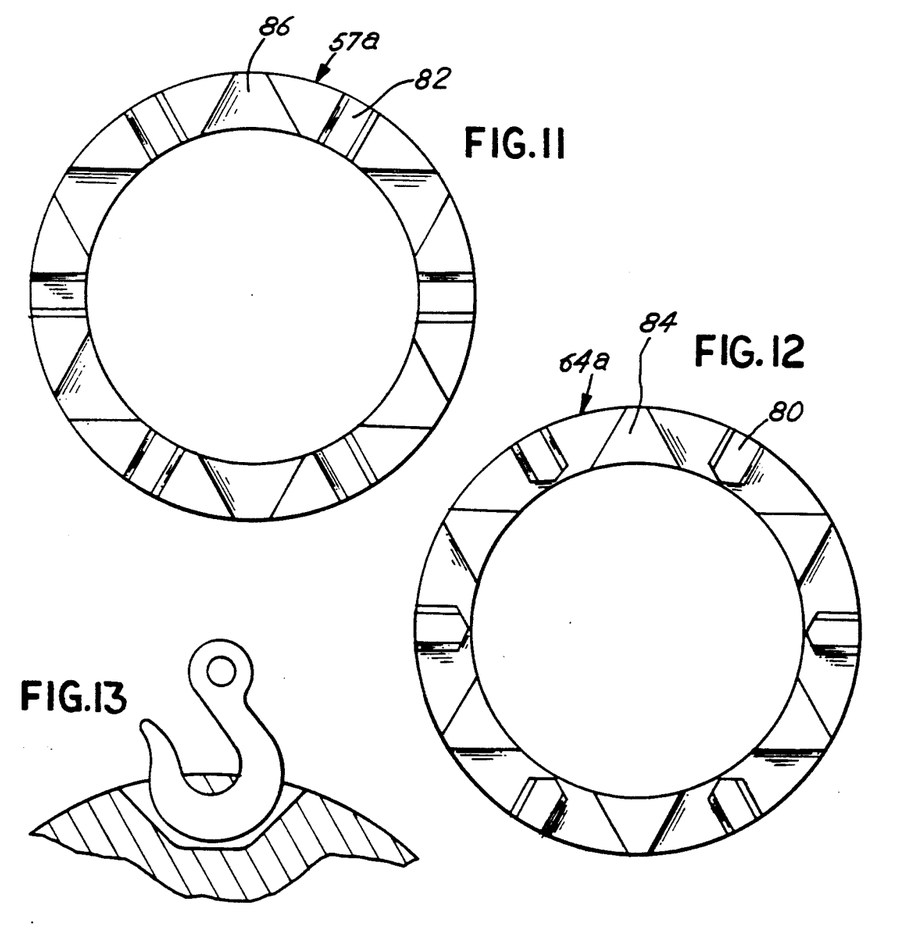
FIGS. 11 and 12 are elevational views of another design of interengaging centering rings carried by the respective mold halves.
FIG. 13 is a fragmentary sectional view showing how the interlocking mold core-defining and cavity-defining members may be lifted by a hook to be removed from or installed into the remainder of the mold.

FIGS. 11 and 12 illustrate another design of abutting, substantially radial ribs and recesses for cavity ring 64 and core ring 57, being respectively labelled 64a and 57a. In this embodiment, radial ribs 80 are provided on ring 64a to fit into radial recesses 82 of ring 57a. However, additionally, other radial ribs 84, and recesses 86 for receiving the radial ribs are of a truncated, triangular shape as shown in a manner similar to that shown and discussed in the previously cited patent.

As before, the respective rings 57a, 64a abut each other when the mold is in closed position to provide the desired centering, in a manner illustrated by FIGS. 6 and 7.

It can be seen that core ring 57 and cavity ring 64 may be used in all of the different molding operations. They may be removed and placed onto the respective interchangeable parts. Also, they may be replaced as well, if desired.

Figure 8:
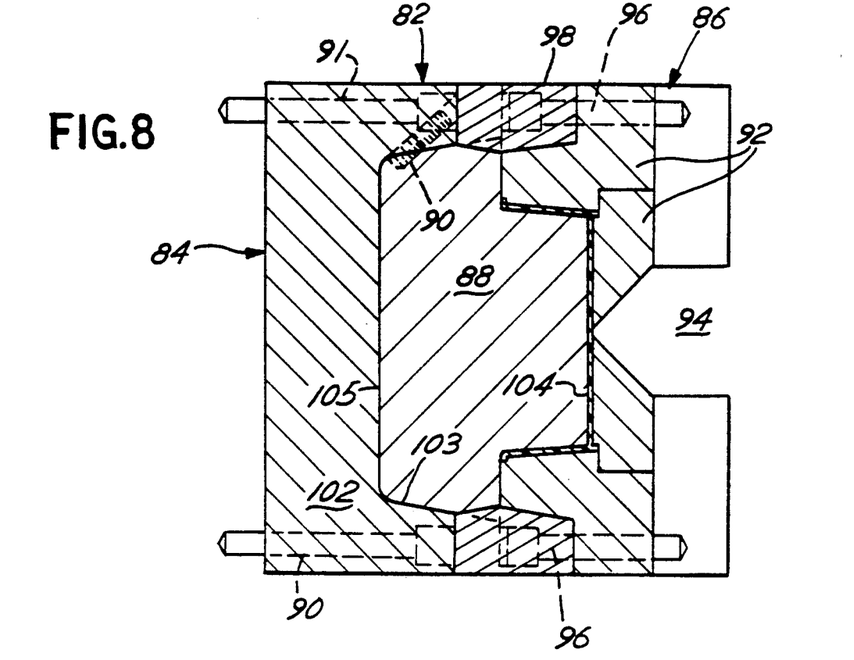
FIGS. 8 and 9 are longitudinal sectional views of an injection mold in which the replaceable core-defining member and cavity-defining member are different within the mold.

Turning to FIG. 8, a mold system of variable length or "height", contrary to the system of FIGS. 6 and 7, is disclosed.

Mold 82 comprises, as before, a mold core assembly 84 and a mold cavity assembly 86. In accordance with this invention, mold core assembly 84 carries an easily removable core-defining member 88 attached by about three peripherally-spaced, angled bolts 90 to the remainder of assembly 84. Bolts 91 hold assembly 84 to a mold platen. Mold cavity assembly 86 also carries an easily removable, cavity-defining member 92 which defines the forward end of a sprue 94, and is secured to the remainder of member 86 by bolts 96.

In this embodiment, a separate cavity ring 98 is provided, being adapted for mating with an annular portion 100 of permanent portion 102 of core assembly 84, with the interlocking between members 98, 100 being preferably the interlocking of radial ribs and grooves in a manner similar to that disclosed for example in FIG. 10 or FIGS. 11 and 12, and for the same purposes.

Thus, molding chamber 104 may be formed, as shown.

Core defining member 88 defines an 8–10 degree frustoconical back taper 103 that fits into a fitting, equally tapered socket 105 of permanent portion 102, for rigid but removable mounting as previously described.

Figure 9:
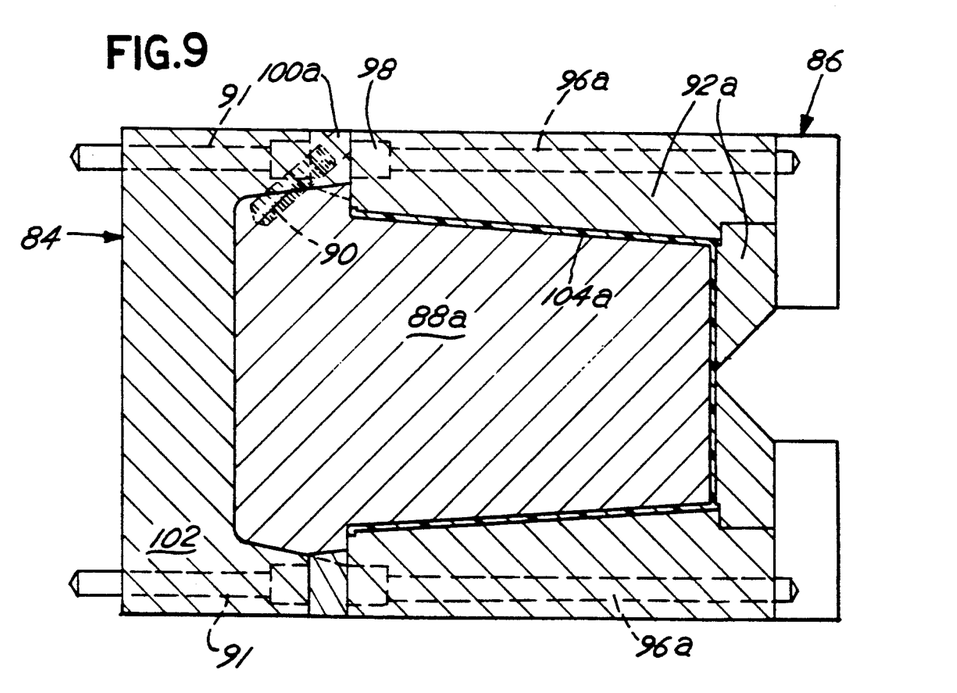

Then, when it is desired to change the shape of the molding chamber to produce a new product, FIG. 9 shows another embodiment that may be applied. Permanent portion 102 of core assembly 84 may carry a different core-defining member 88a which, in the particular embodiment, is substantially longer than the corresponding member 88. The same angled bolts 90, 91 may be used to connect the members.

Likewise, mold cavity assembly 86 carries in the FIG. 9 embodiment a correspondingly elongated cavity-defining member 92a, being secured thereto by bolts 96a. Cavity ring 98 is integral with member 92a, to engage with the radial ribs and recesses of integral, annular portion 100a of permanent core portion 102 in a manner similar to previous embodiments.

Thus, by simple operation, a new mold chamber 104a is provided for producing a different shape of product. Water and air lines may also be present in a manner similar that of FIG. 6.

In this particular embodiment, the spacing of the mold is not constant, as can be plainly seen between FIGS. 8 and 9, and may be used where that does not cause a problem in the mold press used.

Figure 14:
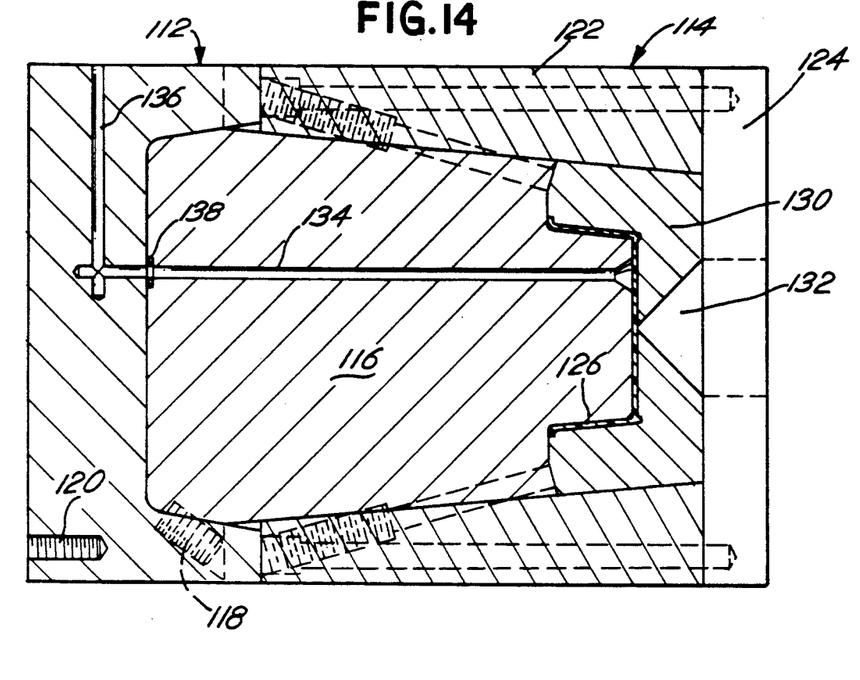
FIGS. 14 and 15 are longitudinal sectional views of an injection mold showing a new embodiment of a system having replaceable core-defining and cavity-defining members.
Figure 15:
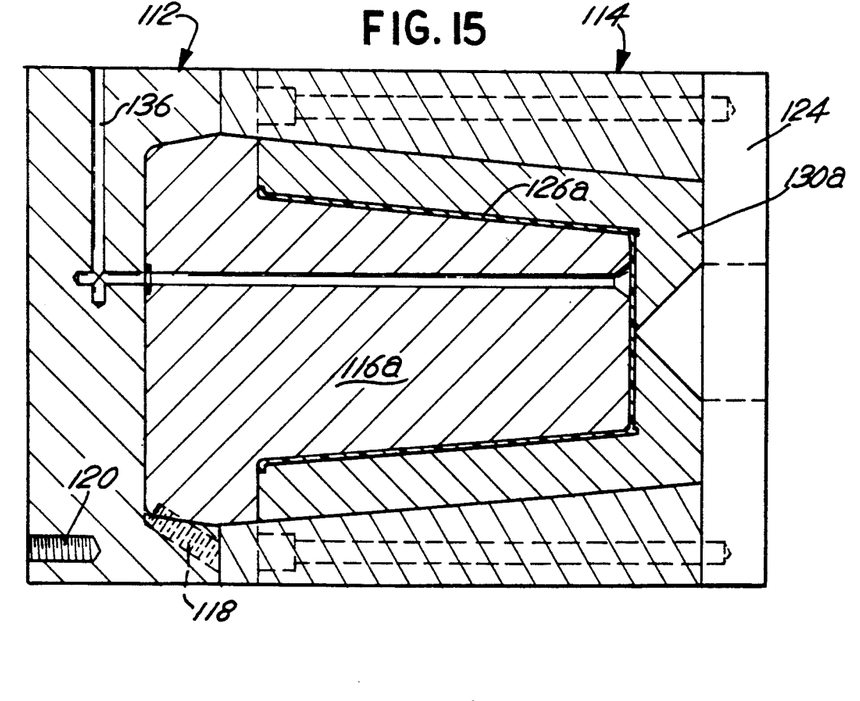

Referring to FIGS. 14 and 15, another design of modular mold is shown in accordance with this invention.

Mold 110 comprises, as before, mold core assembly 112 and a mold cavity assembly 114. In accordance with this invention, mold core assembly 112 carries an easily removable core-defining member 116, which may be retained on the mold core assembly 112 by means of angled bolts 118 peripherally spaced about the assembly, preferably about three in number. Peripherally distributed bolt holes 120 may be used to hold mold core assembly 112 to a mold platen.

Mold cavity assembly 114 in this embodiment defines a permanent, tubular outer portion 122 which is carried on mold platen 124 and does not require replacement as differing designs of mold chamber 126 for molding different products are required.

In accordance with this invention, mold cavity assembly 122 also defines a replaceable inner sleeve-like cavity-defining member 130, which defines mold sprue portion 132, and which may be replaceable along with replaceable core-defining portion 116 for different components which fit in the same mold to define a molding chamber 126 of a desired shape.

As before, an air line 134 or the like may be provided, part of which extends through the replaceable core defining portion 116 and part 136 of which extends through the permanent core assembly 112, with the junction of the two air lines being sealed with an O-ring 138.

Thus, as before, core and cavity defining portions 116, 130 may be replaced as shown in FIG. 15 with new core and cavity defining portions 116a, 130a which are of typically overall equal length and which are attached in their respective sites of mounting through typically the same bolt holes as members 116, 130.

FIG. 15 carries the same components for permanent members as the previous FIG. 14, with the replacement of the desired core and cavity defining portions 116, 130 as may be desired. Upon such replacement, air and water lines at the junctions between replaceable and permanent parts are sealed with an O-ring similar to O-ring 138 as may be desired, so that the connection between the respective lines is automatic upon installation of the cavity and core defining portions.

In this embodiment it can be seen that the cavity defining portions 130, 130a define inner members relative to the permanent mold cavity assemblies, with their length varying to vary the height of the molding chamber 126, 126a. Then, the replaceable core-defining portion 116, 116a is formed in a corresponding manner so that proper molding can take place with the simple replacement and use of various species of members 116, 130, with simple bolting, and without the need to manually disconnect and reconnect water and air lines, or to replace other subsystems of the mold.

In FIGS. 14 and 15, as in the previous designs, some or all of the respective engaging surfaces of the core defining member 116, 116a and the remainder of the mold core assembly 112, and cavity defining member 130, 130a and the remainder of cavity defining assembly 114, are typically outwardly tapered at an angle of 8 to 10 degrees, particularly as shown at surfaces 140, 140a, 142, 142a, for the advantages of firm retention coupled with easy removal previously described.

Thus, by the embodiments shown herein, substantially the same mold and mold press can have replaceable, internal modules which may be replaced from time to time to provide molded products of different shapes and designs, without a significant "tear down" of the molding system. The assembly and disassembly for a new product is simple and quick, providing substantial efficiencies to the manufacturing operation.

The above has been offered for illustrative purposes only, and is not intended to limit the scope of the invention of this application, which is as defined in the claims below.

That which is claimed is:

1. In the method of injection molding objects in a molding chamber which is formed between a core-defining member as part of a mold core assembly and a cavity-defining member as part of a mold cavity assembly, said mold core assembly and cavity assembly opening to remove the molded objects between mold shots; the improvement comprising, in combination:

molding a last object in said molding chamber, and thereafter, without opening said core-defining member and cavity-defining member, removing said core-defining member and cavity-defining member from the respective remainder of said mold core assembly and mold cavity assembly with said last object residing in said molding chamber.

2. The method of claim 1 in which a new core-defining member and a new cavity-defining member forming a mold chamber of a different design are thereafter respectively secured to the remainder of said mold core assembly and mold cavity assembly.

3. In the method of injection molding objects in a molding chamber which is formed between a first core-defining member as part of a mold core assembly and a first cavity-defining member as part of a mold cavity assembly, said mold core assembly and cavity assembly opening to remove the molded objects between mold shots, the improvement comprising, in combination:

molding a last object in said molding chamber; removing said core-defining member and cavity-defining member from the respective remainder of said mold core assembly and mold cavity assembly with said last molded object residing in said molding chamber and without opening said first core-defining member and first cavity-defining member; and thereafter respectively securing to the remainder of said mold core assembly and mold cavity assembly a new core-defining member and a new cavity-defining member forming a mold chamber of a different design, and thereafter molding a new product relative to the first core-defining and cavity-defining members.

4. The method of claim 3 in which said first and new core-defining members are respectively secured to the remainder of the mold core assembly by bolts extending through the same bolt holes in the remainder of the mold core assembly, said bolts and bolt holes extending in an angular relation to the axis of mold opening and closing to be exposed to a side face of the remainder of the core assembly, whereby said core-defining members may be removed and attached without disassembly of the remainder of said mold core assembly.

5. The method of claim 4 in which said first and new cavity-defining members are respectively secured to the remainder of the mold cavity assembly by bolts extending through the same bolt holes in the remainder of the mold cavity assembly, said last-named bolts and bolt holes extending in an angular relation to the axis of mold opening and closing to be exposed to a side face of the remainder of the mold cavity assembly, whereby said cavity-defining members may be removed and attached without disassembly of the remainder of said mold cavity assembly.

6. The method of claim 5 in which said first and new core-defining members and the first and new cavity-defining members respectively define molding chambers of different sizes.

7. The method of claim 6 in which said respective molding chambers of different size define opposed ends of the same shape and size.

8. The method of claim 3 in which said first and new core-defining members and the first and new cavity-defining members respectively define molding chambers of different sizes.

9. The method of claim 8 in which said respective molding chambers of different size define opposed ends of the same shape and size.

10. The method of claim 3 in which said first and new cavity-defining members are respectively secured to the remainder of the mold cavity assembly by bolts extending through the same bolt holes in the mold cavity assembly, said last-named bolts and bolt holes extending in an angular relation to the axis of mold opening and closing to be exposed to a side face of the remainder of the mold cavity assembly, whereby said cavity-defining members may be removed and attached without disassembly of the remainder of said mold cavity assembly.

11. An injection mold which comprises a mold core assembly carrying a core-defining member, and a mold cavity assembly carrying a cavity-defining member, said mold core and mold cavity assemblies being movable between a closed position in which said core and cavity-defining members together define a molding chamber, and an open position in which molded articles may be removed from the chamber; a molding compound sprue communicating with said molding chamber; and releasable means respectively carrying said core and cavity-defining members on said mold core and mold cavity assemblies, to permit frequent replacement of said core and cavity-defining members with different core and cavity-defining members, said releasable means comprising bolt holes defined in said core and cavity-defining members and said mold core assembly and mold cavity assembly, said bolt holes being each directed at an angle to the axis of mold opening and closing, whereby said core and cavity-defining members may be replaced without removal of the remainder of the mold core and mold cavity assemblies.

12. The mold of claim 11 in which said mold core assembly carries a first ring and said mold cavity assembly carries a second ring, said first and second rings meeting in end-abutting relation in the closed position of the mold and spaced from each other in the open position; one of the abutting ends of said rings defining substantially radial rib means, the other of said abutting ends defining substantially radial recess means proportioned to receive said radial rib means in close-fitting relation in the mold-closed position.

13. The mold of claim 12 in which at least one of said first and second rings is integral with one of the mold cavity and core assemblies.

14. The mold of claim 12 in which at least some of said radial rib means and the recess means receiving said radial rib means are of truncated triangular shape.

15. The mold of claim 12 in which the mold core-defining member is carried in a sprocket of the mold core assembly having tapered sidewalls that engage in abutting, parallel manner tapered sidewall portions of the mold core-defining member, said sidewalls and sidewall portions defining an angle of essentially 8° to 11° to the mold longitudinal axis.

16. The mold of claim 11 in which said mold core assembly carries a first ring and said mold cavity assembly carries a second ring, said first and second rings meeting in end-abutting relation in the closed position of the mold and spaced from each other in the open position; one of the abutting ends of said rings defining substantially radial rib means, the other of said abutting ends defining substantially radial recess means proportioned to receive said radial rib means in close-fitting relation in the mold-closed position.

17. The mold of claim 16 in which at least one of said first and second rings is integral with one of the mold cavity and core assemblies.

18. The mold of claim 16 which at least some of said radial rib means and the recess means receiving said radial rib means are of truncated triangular shape.

19. The mold of claim 11 in which said replaceable core and cavity defining members are free of connectors for connection with water and air lines outside of the mold.

20. The mold of claim 11 in which said replaceable core and cavity defining-members are free of a hot runner system.

21. The mold of claim 11 in which the mold cavity-defining member is carried in a socket of the mold cavity assembly having tapered sidewalls that engage in abutting, parallel manner tapered sidewall portions of the mold cavity-defining member, said sidewalls and sidewall portions defining an angle of essentially 8° to 11° to the mold longitudinal axis.

22. The mold of claim 21 in which the mold core-defining member is carried in a socket of the mold core assembly having tapered sidewalls that engage, in abutting, parallel manner, tapered sidewall portions of the mold core-defining member, said sidewalls and sidewall portions defining an angle of essentially 8° to 11° to the mold longitudinal axis.

23. The mold of claim 22 in which each of said angles is essentially 8° to 10°.

24. An injection mold which comprises a mold core assembly carrying a core-defining member, and a mold cavity assembly carrying in a cavity-defining member, said mold core and mold cavity assemblies being movable between a closed position in which said core and cavity-defining members together define a molding chamber, and an open position in which molded articles may be removed from the chamber; a molding compound sprue communicating with said molding chamber; and releasable means respectively carrying said core and cavity-defining members on said mold core and mold cavity assemblies, to permit frequent replacement of said core and cavity-defining members with different core and cavity-defining members, said mold cavity-defining member being carried in a socket of the mold cavity assembly, said socket having tapered sidewalls that engage, in abutting, parallel manner, tapered sidewall portions of the mold cavity-defining member, said tapered sidewalls and tapered sidewall portions each defining an angle of essentially 8° to 11° to the mold longitudinal axis.

25. The mold of claim 24 in which the mold core-defining member is carried in a socket of the mold core assembly, said socket having tapered sidewalls that engage, in abutting, parallel manner, tapered sidewall portions of the mold core-defining member, said last named sidewalls and sidewall portions each defining an angle of essentially 8° to 11° to the mold longitudinal axis.

26. The mold of claim 25 in which the sidewalls and sidewall portions of said mold core-defining member, mold cavity-defining member, mold core assembly, and mold cavity assembly each define an angle of essentially 8° to 10° to the mold longitudinal axis.

27. The mold of claim 25 in which said mold core assembly carries a first ring and said mold cavity assembly carries a second ring, said first and second rings meeting in end-abutting relation in the closed position of the mold and spaced from each other in the open position; one of the abutting ends of said rings defining substantially radial rib means, the other of said abutting ends defining substantially radial recess means proportioned to receive said radial rib means in close-fitting relation in the mold-closed position.

28. The mold of claim 27 in which at least one of said first and second rings is integral with one of the mold cavity and core assemblies.

29. An injection mold which comprises a mold core assembly carrying a core-defining member, and a mold cavity assembly carrying a cavity-defining member, said mold core position in which said core and cavity defining members together define a molding chamber, and an open position in which molded articles may be removed from the chamber; a molding compound sprue communicating with said molding chamber; and releasable means respectively carrying said core and cavity-defining members on said mold core and mold cavity assemblies, to permit frequent replacement of said core and cavity-defining members with different core and cavity-defining members, said mold-core defining member being carried in a socket of the mold-core assembly, said socket having tapered sidewalls that engage, in abutting, parallel manner, tapered sidewall portions of the mold core-defining member, said sidewalls and sidewall portions each defining an angle of essentially 8° to 11° to the mold longitudinal axis.

30. The mold of claim 29 in which said angle is essentially 8° to 10°.

* * * * *